(12) United States Patent
Segal

(10) Patent No.: US 6,199,143 B1
(45) Date of Patent: Mar. 6, 2001

(54) COMPUTING SYSTEM WITH FAST DATA TRANSFER OF CPU STATE RELATED INFORMATION

(75) Inventor: Edward Robert Segal, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/979,863

(22) Filed: Nov. 26, 1997

(51) Int. Cl.[7] ................................................ G06F 12/00
(52) U.S. Cl. .................... 711/120; 711/122; 711/141; 711/142
(58) Field of Search ..................................... 711/100, 147, 711/156, 142, 130, 140, 141, 127, 128, 129, 120, 121, 122, 133, 144, 145

(56) References Cited

U.S. PATENT DOCUMENTS

| | | | |
|---|---|---|---|
| 3,727,192 | * | 4/1973 | Cheney et al. .................... 370/360 |
| 5,291,604 | * | 3/1994 | Kardach et al. .................. 710/261 |
| 5,301,331 | * | 4/1994 | Ueno et al. ...................... 710/260 |
| 5,623,632 | * | 4/1997 | Liu et al. ......................... 711/144 |
| 5,809,525 | * | 9/1998 | Bishop et al. .................... 711/122 |
| 6,047,357 | * | 5/2000 | Bannon et al. ................... 711/133 |

OTHER PUBLICATIONS

Microsoft Press, Computer Dictionary, 1997, p. 513.*

* cited by examiner

*Primary Examiner*—John W. Cabeca
*Assistant Examiner*—Brian R. Peugh
(74) *Attorney, Agent, or Firm*—Michael J. Buchenhorner; Fleit, Kain, Gibbons, Gutman & Bongini P.L.; Casey P. August

(57) ABSTRACT

A method and apparatus in a computer system selectively stores CPU state related information in parallel in a first and a second set of registers. The two sets of registers can selectively transfer data in parallel therebetween to restore the CPU state related information used by the CPU. The second set of registers cm be organized in a cascaded structure or in selective banks of registers to keep track of multiple CPU state related information such as during nested interrupts. The second set of registers can tansfer data with a third data storage device asynchronously to the operation of the CPU.

5 Claims, 6 Drawing Sheets

COMPUTING SYSTEM WITH FAST DATA TRANSFER OF CPU STATE RELATED INFORMATION

This application is related to U.S. patent application No. 08/978,770, U.S. patent application No. 08/979,037 now U.S Pat. No. 6,070,193, and U.S. patent application No. 08/977,768, all filed on Nov. 26, 1997, and the entire disclosure of which is herein incorporated by reference.

FIELD OF THE INVENTION

The invention broadly relates to the field of memory systems in data processing systems, and more particularly relates to the fields of fast-storing information and performing memory operations asynchronously. The invention selectively stores state information in parallel and manages memory operations for the central processing unit asynchronously. This saves processor time and speeds up computer applications.

BACKGROUND OF THE INVENTION

The process of storing or moving information within a computer system is often time consuming and inefficient. This can be seen in the cases of storing state information and in storing data to external memory.

The process of storing state information from a central processing unit's ("CPU's") registers is usually accomplished by pushing the information onto the system's stack when the CPU is interrupted, and then popping the information off of the stack when the CPU resumes that task. Each of the registers is pushed and popped serially and the operations are all controlled by the CPU. The time required by the CPU is even greater in a context-switching or multi-tasking environment where this process occurs on a regular basis as the CPU switches between tasks that are incomplete.

The process of moving data between memory locations is also a time intensive operation for the CPU. In a memory swap operation, for example, the CPU needs to perform two reads and two writes on the external bus and an internal temporary store. When large blocks are moved, this process is repeated for every word, and it all needs to be controlled by the CPU. Note that this operation is different from the memory access operations of an input/output device which can often be controlled with a Direct Memory Access ("DMA") Controller.

Accordingly, there is a need for a system of storing state information, and of storing or moving data in memory which overcomes the above problems.

SUMMARY OF THE INVENTION

A computer system comprises a CPU, a first at least one data storage device, electrically coupled to the CPU, for providing data storage to the CPU for CPU state information, and a second at least one data storage device, communicatively coupled to the first at least one data storage device and to the CPU, for selectively storing in parallel the CPU's state information that is also stored in the first at least one data storage device. A means for selectively controlling data transfer between the first and second at least one data storage devices, respectively, controls data transfer to selectively store CPU state information in the first at least one data storage device that is also stored in the second at least one data storage device.

A method comprises the steps of: storing a CPU's state information into a first at least one data storage delce, selectively storing in parallel the CPU's state information into a second at least one data storage device, and selectively controlling data transfer between the first and second at least one data storage devices, respectively, to selectively store the CPU's state information in the first at least one data storage device that is also stored in the second at least one data storage device.

DESCRIPTION OF THE PREFERRED EMBODIMENT

Figure 1:
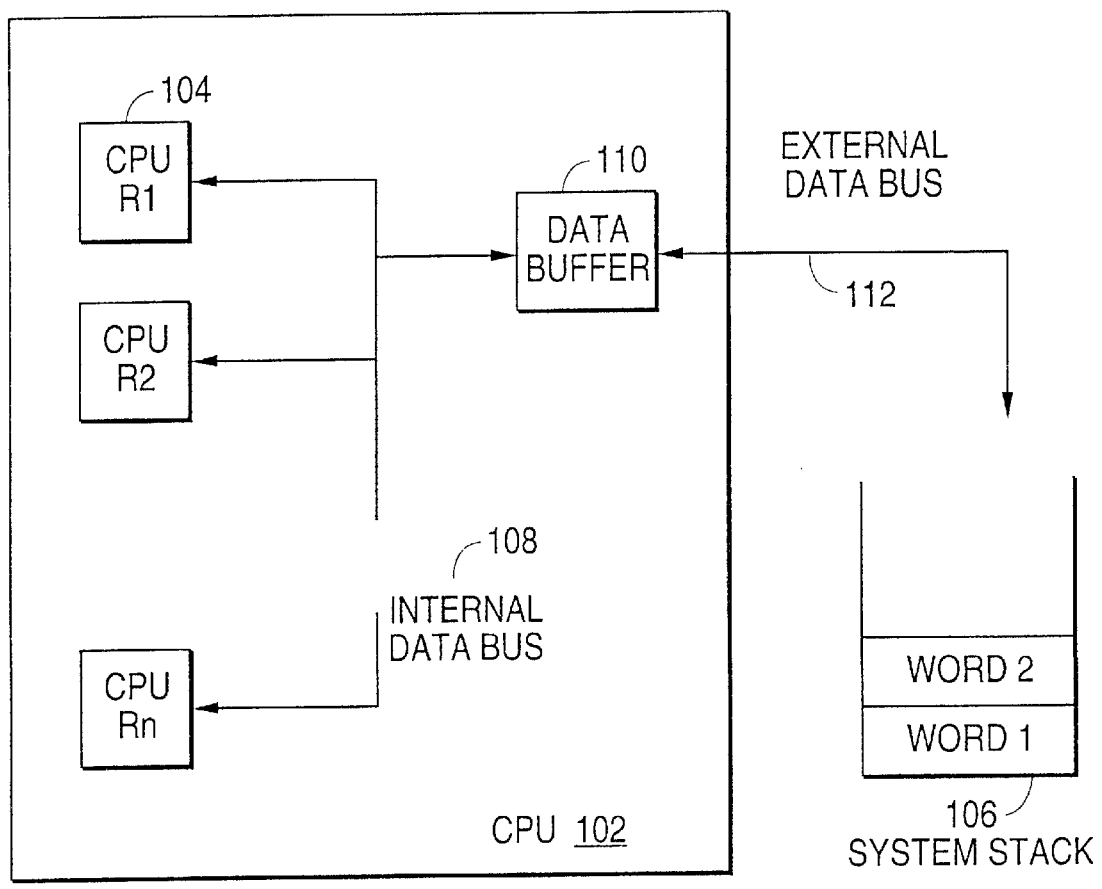
FIG. 1 is an illustration of an accepted method of storing the state registers of a CPU during an interrupt.

Referring to FIG. 1, the system 100 shown illustrates an accepted method of storing the state information contained in a CPU's registers 104 during an interrupt. While this method is only concerned with the state information in the CPU's registers, state information can include any information that pertains to a specific process and which is subject to being lost when an interrupt allows a new process to be executed. In the accepted method, when an interrupt occurs, the contents of the registers 104 are "pushed", one register at a time, onto the system's stack 106, which is external to the CPU 102. When the interrupt service routine is finished, the contents of the registers 104 are restored to their original values by "popping" the information off of the stack 106, again in a serial fashion.

There are other methods of implementing a stack, either internal or external to the CPU. One such method, which is internal to the CPU, is the cascade structure, which is usually implemented with a series of daisy-chained parallel-in/parallel-out registers.

Figure 2:
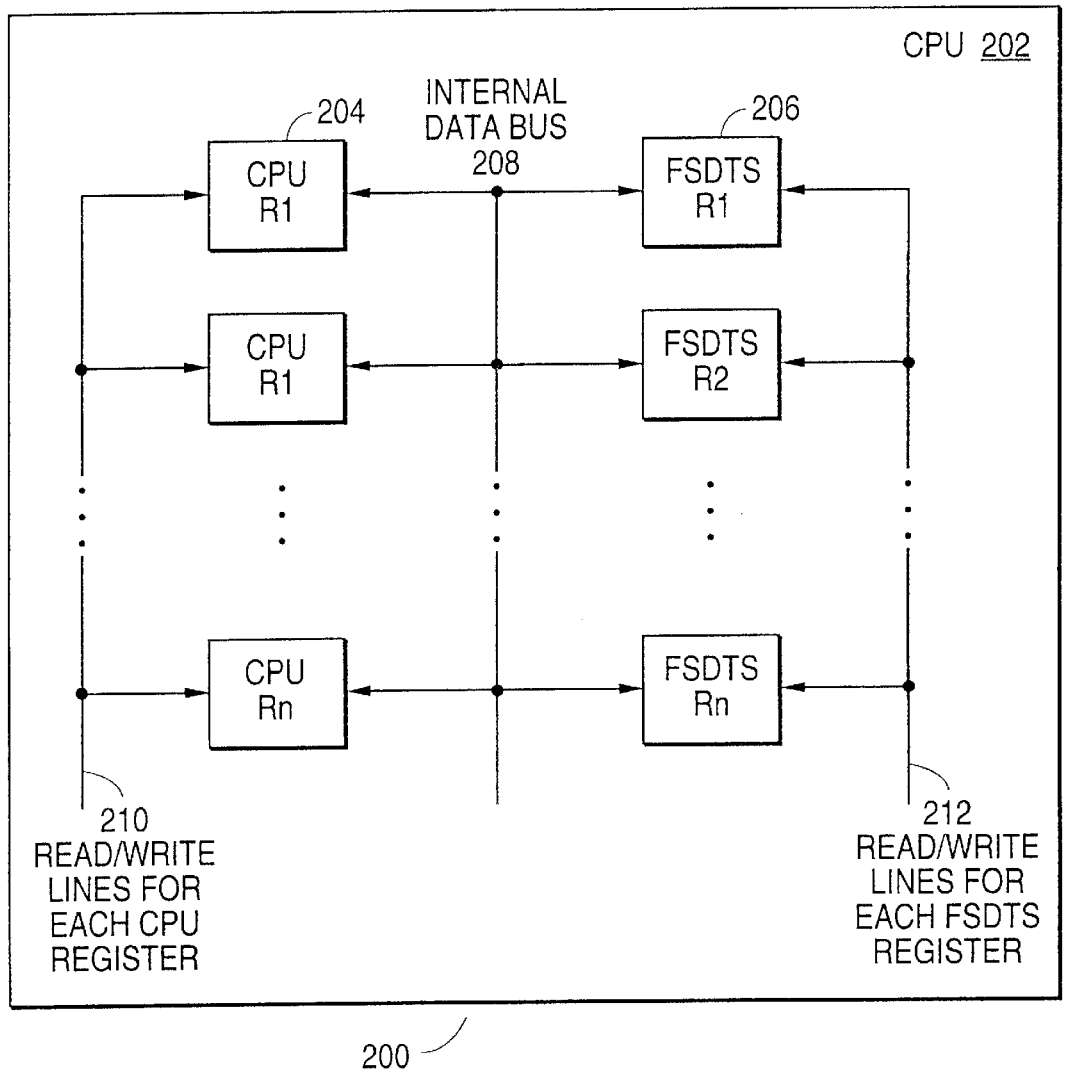
FIG. 2 is an illustration of a FSDTS according to the present invention which employs register-shadowing.

Referring to FIG. 2, the system 200 shown illustrates a fast-store data transfer system ("FSDTS") according to the present invention. When the CPU 202 receives an interrupt, the state information in the CPU registers 204 still gets stored before the CPU 202 switches to the new process, but it is stored into another set of registers, the FSDTS registers 206, which are internal to the CPU 202 instead of into an external system stack. The FSDTS registers 206 store the state information by "shadowing" the CPU registers 204. The FSDTS registers 206 shadow the CPU registers 204 by: (i) being connected to the same internal data bus 208 as the CPU registers 204, and (ii) reading the data on that bus 208 at the same time that the CPU registers 204 do so. The CPU 202 controls the shadowing by operating the read/write lines for the FSDTS registers 212 in tandem with the read/write lines for the CPU registers 210. In that way, each time the CPU registers 204 are updated, the FSDTS registers 206 are updated as well.

When an interrupt is received, the CPU 202 can store the current state information of the CPU registers 204 by tri-stating the read/write lines for the FSDTS registers 212 and operating the read/write lines for the CPU registers 210 in the normal manner. The CPU registers 204 will still be free to hold whatever state information the new process may need or generate, but the FSDTS registers 206 will not be shadowing the interrupt service routine, or whatever new process is running. Later, when the CPU 202 returns to the original process, the original state information can be restored to the CPU registers 204 by the CPU's putting the read/write lines for the FSDTS registers 212 into the write mode and by putting the read/write lines for the CPU registers 210 into the read mode.

Figure 3:
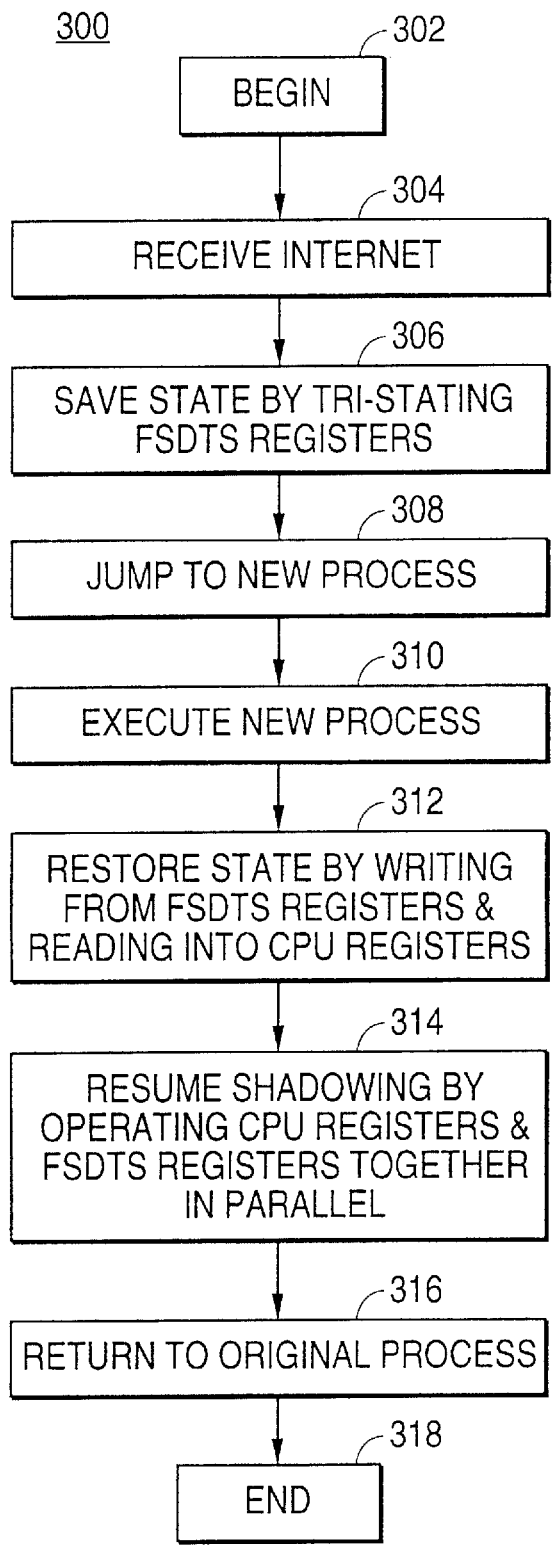
FIG. 3 is a flow diagram of a FSDTS according to the present invention which employs register-shadowing.

The above process is illustrated in the flow diagram 300 of FIG. 3. When the CPU receives an interrupt 304, it saves the state information of the current process by tri-stating the FSDTS registers 306. The CPU then can jump to the new process 308 and execute it 310. When the CPU finishes executing the new process 310, it restores the state information of the original process by putting the read/write lines for the FSDTS registers into the write mode and by putting the read/write lines for the CPU registers into the read mode 312. Once the state is restored, the CPU resumes operating the CPU read/write lines normally to save state and operates the FSDTS read/write lines in tandem to shadow 314. The CPU then returns to the original process 316.

The benefits of the FSDTS are that (i) the stack is implemented internal to the CPU, (ii) the pushes and pops are done in parallel, and (iii) the pushes are quicker due to shadowing. Each of these factors is a benefit because it saves CPU processing time.

Figure 4:
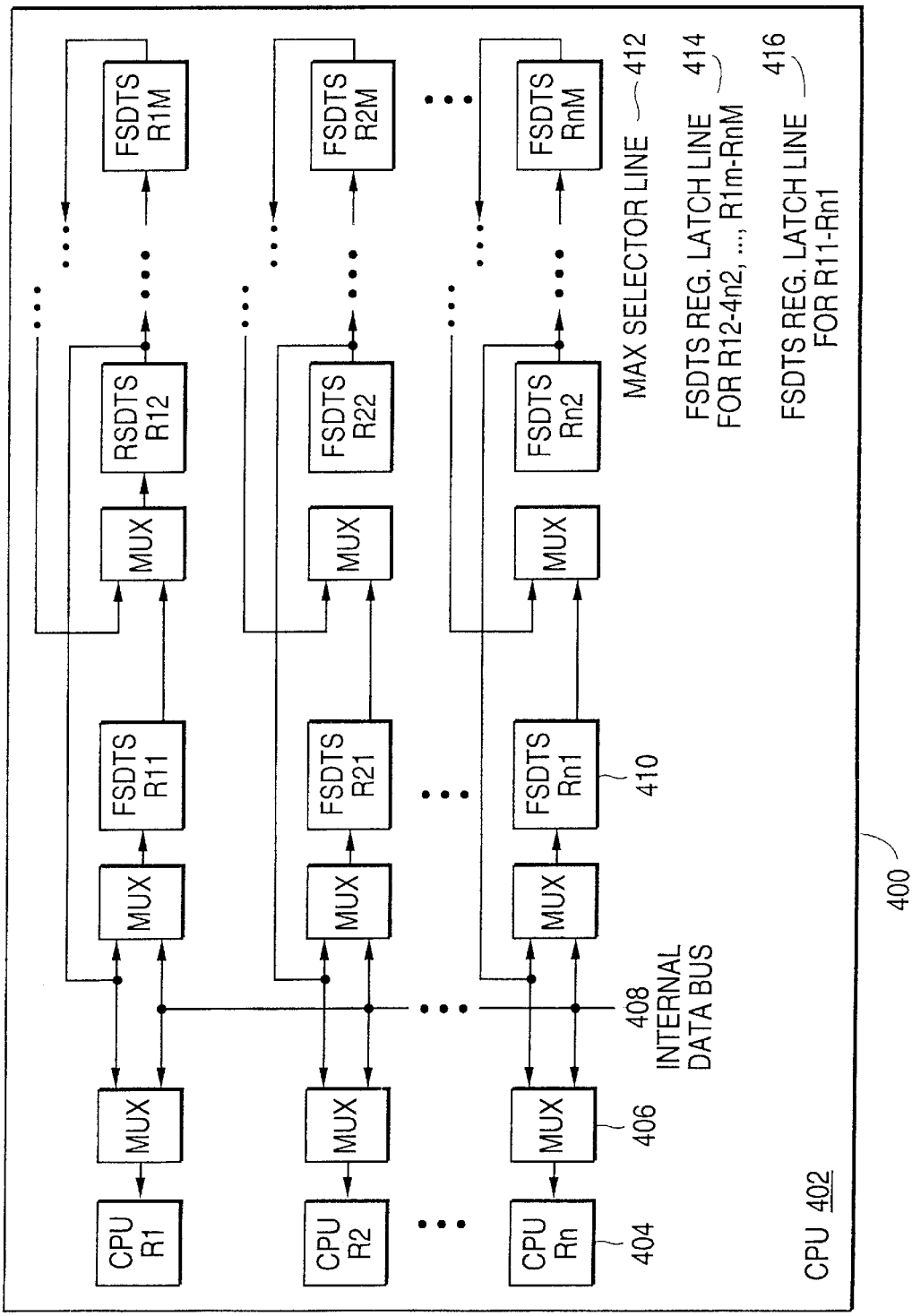
FIG. 4 is an illustration of an alternate embodiment of a FSDTS according to the present invention which employs cascaded memory elements.

FIG. 4 illustrates an FSDTS 400 according to the present invention that can handle up to "m" nested interrupts. The FSDTS registers 410 are parallel-in/parallel-out registers which accept the data at their inputs when their "latch" signal 414–416 is active. The FSDTS registers 410 are dual-cascaded, such that the output of FSDTS register R11 feeds the input of FSDTS register R12, etc., and the output of FSDTS register R1m feeds the input of FSDTS register R1(m-1), etc.

Only FSDTS registers R11-Rn1 are connected to the internal data bus 408 and shadow the CPU registers 402. When an interrupt is received, the FSDTS registers 402 are all latched to push the data one level deeper into the array. The multiplexers 406 are used to switch between pushes and pops, as explained below.

Figure 5:
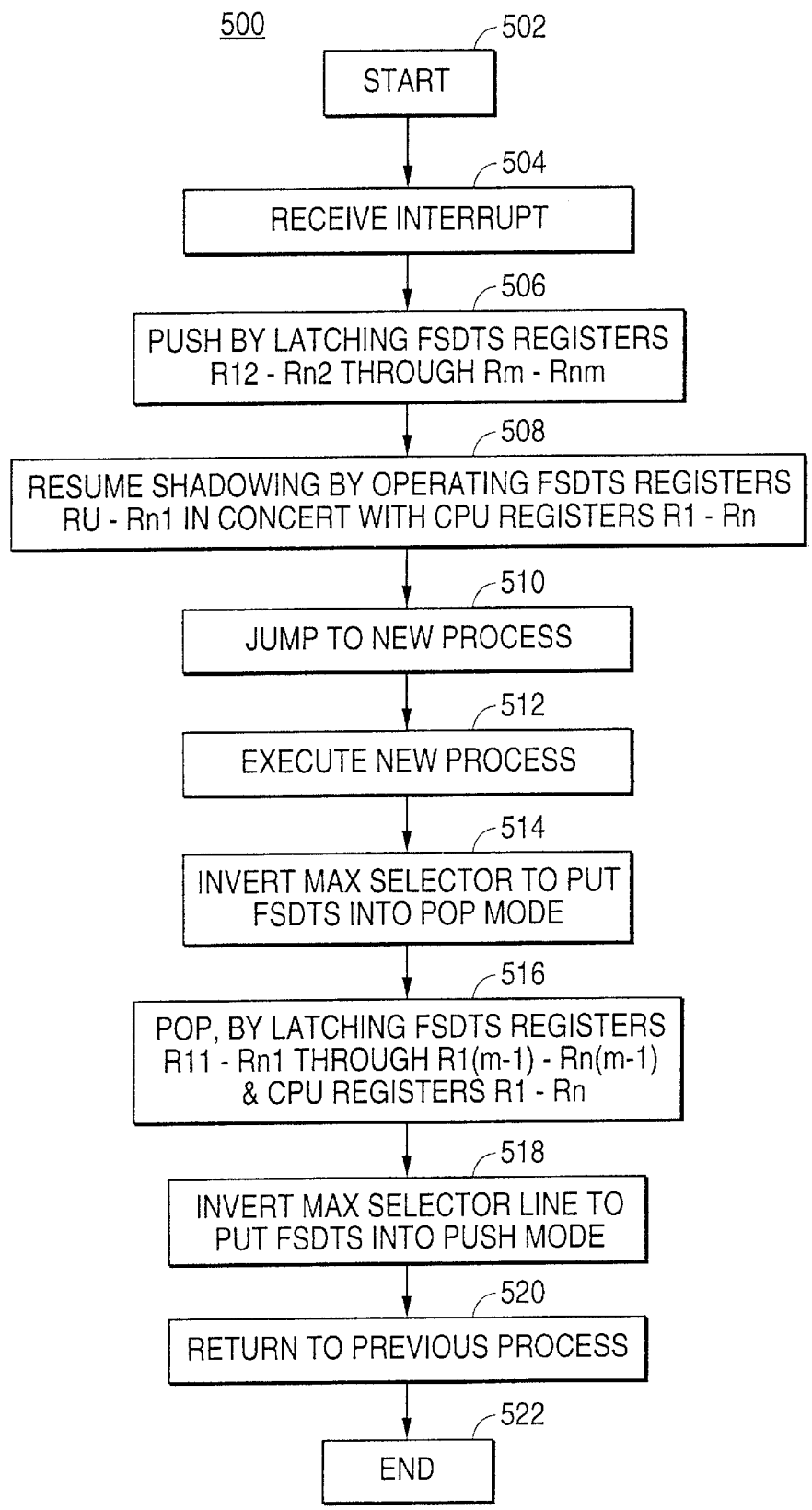
FIG. 5 is a flow diagram of an alternate embodiment of a FSDTS according to the present invention which employs cascaded memory elements.

The process is illustrated by the flow diagram 500 in FIG. 5. When the CPU receives an interrupt 504, it is already in the push mode 518, which means that the multiplexers, which are located in front of the inputs to nx(m-1) of the FSDTS registers as well as the n CPU registers, are accepting the upstream, or most recent, data. The CPU then executes a push by activating the latch signals for FSDTS registers R12–Rn2 through R1m–Rnm during the appropriate period of one data cycle 506, and thereby stores all of the data that are at the FSDTS registers' inputs. The push cascades the previous m-1 pushes one level deeper into the array. After this the CPU needs to resume latching the FSDTS registers R11–Rn1 in tandem with the CPU registers Ri-Rn to shadow the state information of the new process in case another interrupt occurs 508. The CPU then jumps to the new process 510 and executes it 512. When it is finished it switches each of the nxm multiplexers, which are in front of nx(m-1) of the FSDTS registers R11–Rn1 through R1(m-1)–Rn(m-1) as well as the n CPU registers, so that they are accepting the downstream data 514. This puts the multiplexers into the pop mode. The CPU then again simultaneously latches the nx(m-1) FSDTS registers R11–Rn1 through R1(m-1)–Rn(m-1) and the n CPU registers during the appropriate period of the data cycle to effect the pop 516. The CPU then puts all of the nxm multiplexers back into the push mode 518, as explained above, before returning to the interrupted process 520. The CPU does this so that the FSDTS is ready for an interrupt as quickly as possible. Indeed, to be completely safe, the system would need to disable interrupts, or at least suspend acting on them, from the time it initiates a pop to the time it executes the instruction to put the multiplexers back into the push mode. If the system received a nested interrupt, it would receive it 504, but it may delay acting on it because steps 514–518 must be executed in sequence.

The FSDTS 400 of FIG. 4 provides the same benefits of the FSDTS 200 of FIG. 2, and expands these benefits to m nested interrupts.

In an alternate embodiment, the memory elements of the FSDTS 400 in FIG. 4 could be external to the CPU. In such an embodiment, it would be profitable for the CPU to have a dedicated bus to the memory elements of the FSDTS, but this is not necessary.

In another alternate embodiment, the FSDTS could utilize the system stack or other memory, either internal or external to the CPU, for additional push and pop space. Such an embodiment could utilize this additional space when its own space was filled up, such as after m nested pushes, or the FSDTS could continually write its contents to this space to help prevent the situation of an overflow if m+1 nested interrupts occurred in rapid succession. Depending on the architecture, the FSDTS could even write to this additional space asynchronously from the CPU's operations.

In another alternate embodiment, each of the nxm FSDTS registers could be connected to the internal data bus, which would be a common input to each FSDTS register. During a push operation, the programmer would need to specify which bank of FSDTS registers were to be used. This could be specified with a single number i, where i is between 1 and m, such that the FSDTS registers R1i–Rni, for fixed n, would be used. In this way, the register banks are not cascaded and nested interrupts are dealt with by specifying different values of i for each nested push, and then using the same value of i for the corresponding pop.

In another alternate embodiment, the FSDTS could employ Nxm registers, where N is chosen large enough so that all data elements internal to the CPU can be pushed and popped, with up to m nested pushes. These other data elements may comprise a scratch pad or working area, temporary storage registers, etc. The FSDTS 600 illustrated in FIG. 6, takes this embodiment one step further by adding multiplexers so that all of the data elements internal to the CPU can be selectively pushed and popped.

Figure 6:
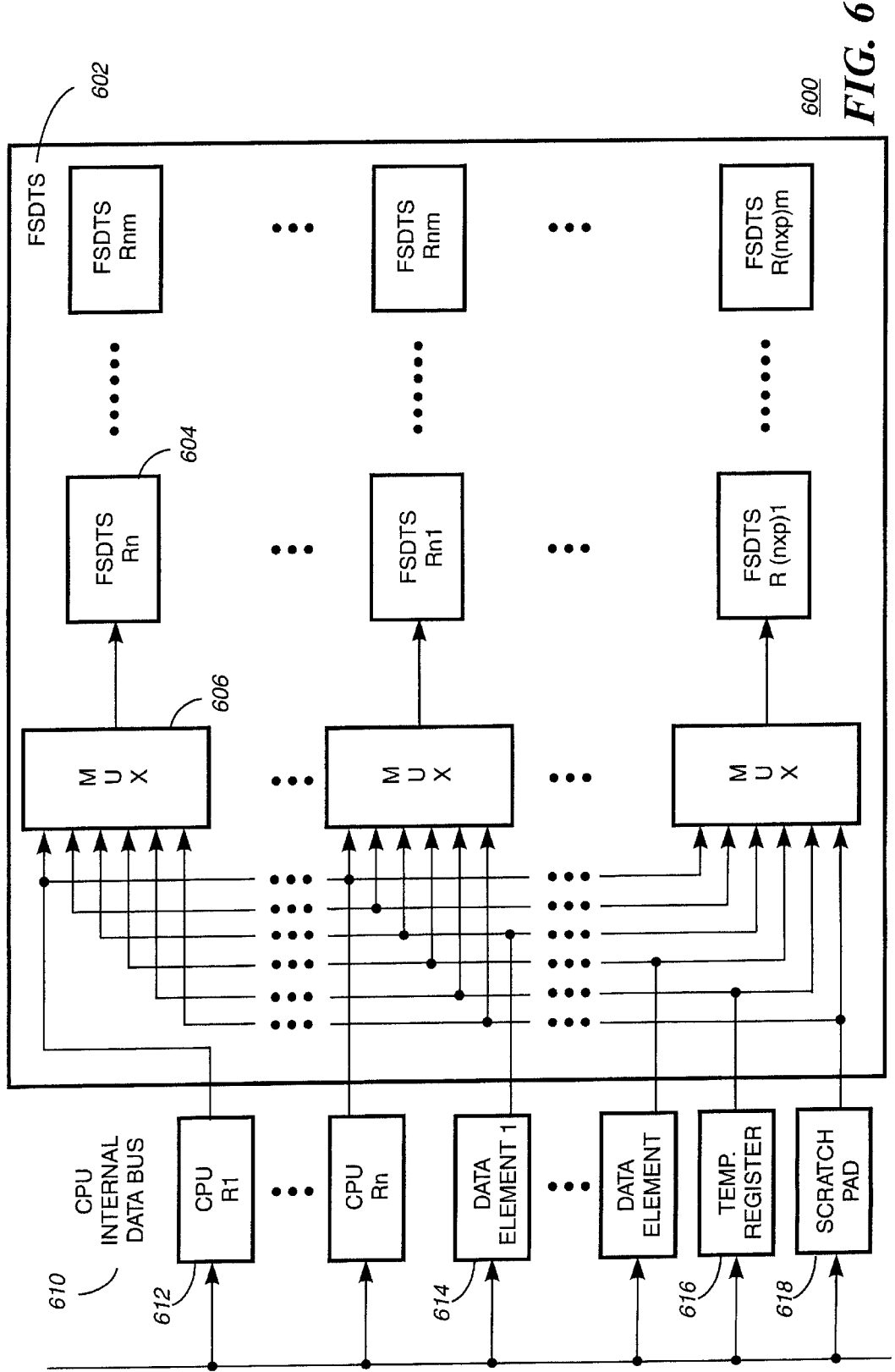
FIG. 6 is an illustration of an alternate embodiment of a FSDTS according to the present invention which allows selective storing and transferring of data.

Referring to FIG. 6, the FSDTS registers 604 do not shadow the CPU's registers 612, but are multiplexed to a number of different data elements internal to the CPU 612–618. The number of inputs to each multiplexer 606 is dependent only on the system's requirements and each data element 612–618 could be cross-multiplexed to each "row" of the FSDTS. This design allows greater flexibility to the programmer, because new commands could be created that allow the programmer to selectively push or pop any subset of the CPU's data elements 612–618. An example is "PUSH R1, R5, TR, DE6". In this command, the FSDTS 602 would set the first multiplexer to accept input from CPU R1, the second to accept input from CPU R5, the third from Temporary Register 616, the fourth from Data Element 6, and the rest would be "don't cares."

The FSDTS 602 of FIG. 6 can be internal or external to the CPU, depending on architecture considerations. Clearly, if there are a lot of data storage elements internal to the CPU or there is only one external data bus, then the FSDTS would be most easily implemented internal to the CPU.

In an alternate embodiment, the FSDTS, or a portion of it, could be tailored to be used as a fast-store device for specific types of commands, such as store commands, move commands, write commands, or read commands. In these embodiments, the FSDTS, or the sub-FSDTS if only a portion of the FSDTS is so dedicated, would also need to serve as a memory interface. As an example of a store-dedicated FSDTS, the FSDTS could allow the CPU to store the data into the FSDTS memory, registers or RAM or otherwise, and the FSDTS would then be responsible for storing this data to system memory asynchronously from the CPU's operations. This would relieve the CPU from the time involved in accessing the external buses, dealing with contention and wait states, etc. Depending on the design requirements, the FSDTS memory interface may be implementable in logic, or it may require a processor. The FSDTS memory, again, could be located internal or external to the CPU, with external FSDTS memory possibly having a dedicated bus or the CPU having additional buses and the computer system using multiple-port memory devices. The FSDTS could also execute the entire opcode associated with such moves or stores, etc. In this way, the entire operation would be done asynchronously, although the CPU would need some means, such as a flag, for knowing when the FSDTS had completed the operation.

The above alternative embodiment would also allow a number of new commands. For example, in a store-oriented FSDTS, the programmer could direct the FSDTS to store to a series of memory locations using a single command such as "STORE REG. 1, MEMORY LOCATION x, MEMORY y, MEMORY z, MEMORY a, REG. 4" which would: (i) store the contents of CPU register R1 into system memory at address x, (ii) move the contents at system memory address y to address z, and (iii) move the contents of memory address a into CPU register R4.

In an alternative embodiment, a FSDTS could be implemented with one memory device would could serve as a general purpose FSDTS. Such a system could shadow registers, selectively push the contents of all internal CPU memory elements, asynchronously perform commands which interface with system memory, or any combination of these functions or any other functions described above.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method comprising the steps of:

storing a CPU's state related information into a first at least one data storage device; and selectively storing in parallel the CPU's slate related information into a second at least one data storage device; and where the second at east one data storage device comprises a plurality of data storage devices, and wherein the step of selectively storing in parallel comprises the step of selectively storing the CPU's state related information in parallel into the plurality of data storage devices in a cascaded fashion.

2. The method of claim 1 further comprising the step of;

selectively transferring CPU state related information in parallel into the first at least one data storage device from the plurality of data storage devices in a cascaded fashion.

3. A computer system comprising:

a CPU;

a first at least one data storage device, electrically coupled to the CPU, for providing data storage to the CPU for CPU state related information;

a second at least one data storage device, communicatively coupled to the first at least one data storage device and to the CPU, for selectively storing in parallel the CPU's state related infrmation that is also stored in the first at least one data storge device; and means for selectively controlling data transfer between the first and second at least one data storage devices, respectively, to selectively store CPU state related information in the first at least one data storage device that is also stored in the second at least one data storage device; and wherein the first at least one data storage device comprises a first at least one register electrically coupled to the CPU for providing data storage to the CPU for CPU state related information;

the second at least one data storage device comprises a second at least one register electrically coupled to the first a least one register and to the CPU, for selectively storing in parallel CPU state related information that is also stored in the first at least one register; and the means for selectively controlling data transfer, selectively controls data tranfer between the first and second at least one register, respectively, to selectively store CPU state related information in the first at least one register that is also stored in the second at least one register.

4. The computer system of claim 3 wherein the second at least one register comprises a cascaded register structure.

5. The computer system of claim 3 wherein the second at least one register comprises a plurality of registers electrically connected to a common input, and wherein the means for selectively controlling data transfer, selectively controls data transfer between the first at least one register and a selected at least one of the plurality of registers.

* * * * *